(12) United States Patent
Huff et al.

(10) Patent No.: US 7,907,705 B1
(45) Date of Patent: Mar. 15, 2011

(54) SPEECH TO TEXT FOR ASSISTED FORM COMPLETION

(75) Inventors: Gerald Huff, Berkeley, CA (US); Roy Goldman, Cupertino, CA (US)

(73) Assignee: Intuit Inc., Mountain View, CA (US)

( * ) Notice: Subject to any disclaimer, the term of this patent is extended or adjusted under 35 U.S.C. 154(b) by 1178 days.

(21) Appl. No.: 11/545,937

(22) Filed: Oct. 10, 2006

(51) Int. Cl.
*H04M 11/06* (2006.01)

(52) U.S. Cl. ............ 379/88.14; 370/352; 704/235; 709/242

(58) Field of Classification Search ......... 235/380; 379/52, 68, 88.14, 221.86, 265.09, 266.01; 434/238; 455/41.1; 704/200, 270.1, 235; 705/1; 370/352; 709/242
See application file for complete search history.

(56) References Cited

U.S. PATENT DOCUMENTS

| | | | | |
|---|---|---|---|---|
| 5,163,081 | A * | 11/1992 | Wycherley et al. ............ | 379/52 |
| 7,120,700 | B2 * | 10/2006 | Beck et al. ................... | 709/242 |
| 7,395,959 | B2 * | 7/2008 | Kirkland et al. .............. | 235/380 |
| 7,502,448 | B1 * | 3/2009 | Elman et al. .................. | 379/68 |
| 2002/0111794 | A1 * | 8/2002 | Yamamoto et al. ........... | 704/200 |
| 2003/0050777 | A1 * | 3/2003 | Walker, Jr. ................... | 704/235 |
| 2004/0203350 | A1 * | 10/2004 | Shultz et al. ................. | 455/41.1 |
| 2005/0026121 | A1 * | 2/2005 | Leonhard ...................... | 434/238 |
| 2005/0080628 | A1 * | 4/2005 | Kuperstein ................. | 704/270.1 |
| 2005/0209868 | A1 * | 9/2005 | Wan et al. ......................... | 705/1 |
| 2005/0238163 | A1 * | 10/2005 | Brown et al. ............. | 379/266.01 |
| 2006/0008069 | A1 * | 1/2006 | Deo et al. ................ | 379/221.06 |
| 2006/0146990 | A1 * | 7/2006 | Wagner et al. ............... | 379/67.1 |
| 2006/0153173 | A1 * | 7/2006 | Beck et al. .................... | 370/352 |
| 2006/0203993 | A1 * | 9/2006 | Busey et al. ............. | 379/265.09 |
| 2007/0003029 | A1 * | 1/2007 | Vesterinen ................. | 379/88.14 |

* cited by examiner

*Primary Examiner* — Gerald Gauthier
(74) *Attorney, Agent, or Firm* — Osha • Liang LLP

(57) ABSTRACT

A method for capturing information from a live conversation between an operator and a customer, involving monitoring the live conversation between the operator and the customer, recognizing at least one portion of the live conversation as a text portion upon converting the live conversation to text, interpreting a cue in the live conversation, relating the cue to an information field associated with a context for the live conversation, and storing information obtained from the text portion into the information field, wherein the information obtained from the text portion includes at least one word spoken after the cue.

25 Claims, 4 Drawing Sheets

SPEECH TO TEXT FOR ASSISTED FORM COMPLETION

BACKGROUND

Commonly in business, companies are required to record customer information received over a phone call. This information must be rapidly and accurately recorded to ensure the best possible customer service and satisfaction. The processes used to acquire this information have evolved over time as technologies, such as computer applications, have improved.

Typically, upon receiving a call, small businesses record customer information by having an operator take notes onto a paper notepad or a form. These notes may later be transcribed into a computer system or filed in order to keep a historical record of the transaction. Alternatively, in larger businesses, phone operators enter the customer information directly into a computer system while on the phone with the customer.

Speech recognition is a process by which speech is converted to text by a computer program. Speech recognition can be used to capture verbal commands or data to be used as information in computer programs.

A common use of speech recognition is in dictation systems, such as Dragon Naturally Speaking® (Dragon Naturally Speaking is a registered trademark of Nuance Communications, Inc., headquartered in Burlington, Mass.). In a dictation system, the user speaks into a microphone connected to a computer, and the words spoken are interpreted either as commands to be run on the computer or as transcription that should be entered into, for example, a word processing program. A dictation system typically has a process by which it learns to better recognize the speech of the user in order to improve the accuracy of the speech recognition.

In the case of an Interactive Voice Response (IVR) system, speech recognition is used to both capture commands and data in order to facility customer service in a phone operating system. A customer calling into such a system would be prompted by an IVR system with a series of questions that when answered may be confirmed by the IVR system with questions, such as "Did you say billing?" IVR systems are typically used to obtain preliminary information before forwarding to an actual operator or responding to simple inquiries that do no require operator intervention.

SUMMARY

In general, in one aspect, the invention relates to a method for capturing information from a live conversation between an operator and a customer, comprising monitoring the live conversation between the operator and the customer, recognizing at least one portion of the live conversation as a text portion after converting the live conversation to text, interpreting a cue in the live conversation, relating the cue to an information field associated with a context for the live conversation, and storing information obtained from the text portion into the information field, wherein the information obtained from the text portion comprises at least one word spoken after the cue.

In general, in one aspect, the invention relates to a system for capturing information from a live conversation between an operator and a customer, comprising a speech recognition engine, wherein the speech recognition engine is configured to recognize the live conversation as a text portion after converting the live conversation to text, a context designator configured to designate a context for storing information from the text portion obtained by interpreting a cue in the live conversation, and a document completion engine configured to record information obtained from the text portion into an information field within the context, wherein the information obtained from the text portion comprises at least one word spoken after the cue.

In general, in one aspect, the invention relates to a computer readable medium comprising instructions to perform a method for capturing information from a live conversation between an operator and a customer, comprising monitoring the live conversation between the operator and the customer, recognizing at least one portion of the live conversation as a text portion after converting the live conversation to text, interpreting a cue in the live conversation, relating the cue to an information field associated with a context for the live conversation, and storing information obtained from the text portion into the information field, wherein the information obtained from the text portion comprises at least one word spoken after the cue.

In general, in one aspect, the invention relates to a computer readable medium organized in a library comprising instructions to provide a method for capturing information from a live conversation between an operator and a customer, comprising monitoring the live conversation between the operator and the customer, recognizing at least one portion of the live conversation as a text portion after converting the live conversation to text, interpreting a cue in the live conversation, relating the cue to an information field associated with a context for the live conversation, and storing information obtained from the text portion into the information field, wherein the information obtained from the text portion comprises at least one word spoken after the cue.

In general, in one aspect, the invention relates to a computer system for capturing information from a live conversation between an operator and a customer, comprising a processor, a memory, a storage device, and software instruction stored in the memory for enabling the computer system under control of the processor to monitor the live conversation between the operator and the customer, recognize at least one portion of the live conversation as a text portion after converting the live conversation to text, interpret a cue in the live conversation, relate the cue to an information field associated with a context for the live conversation, and store information obtained from the text portion into the information field, wherein the information obtained from the text portion comprises at least one word spoken after the cue.

Other aspects of the invention will be apparent from the following description and the appended claims.

DETAILED DESCRIPTION

Figure 1:
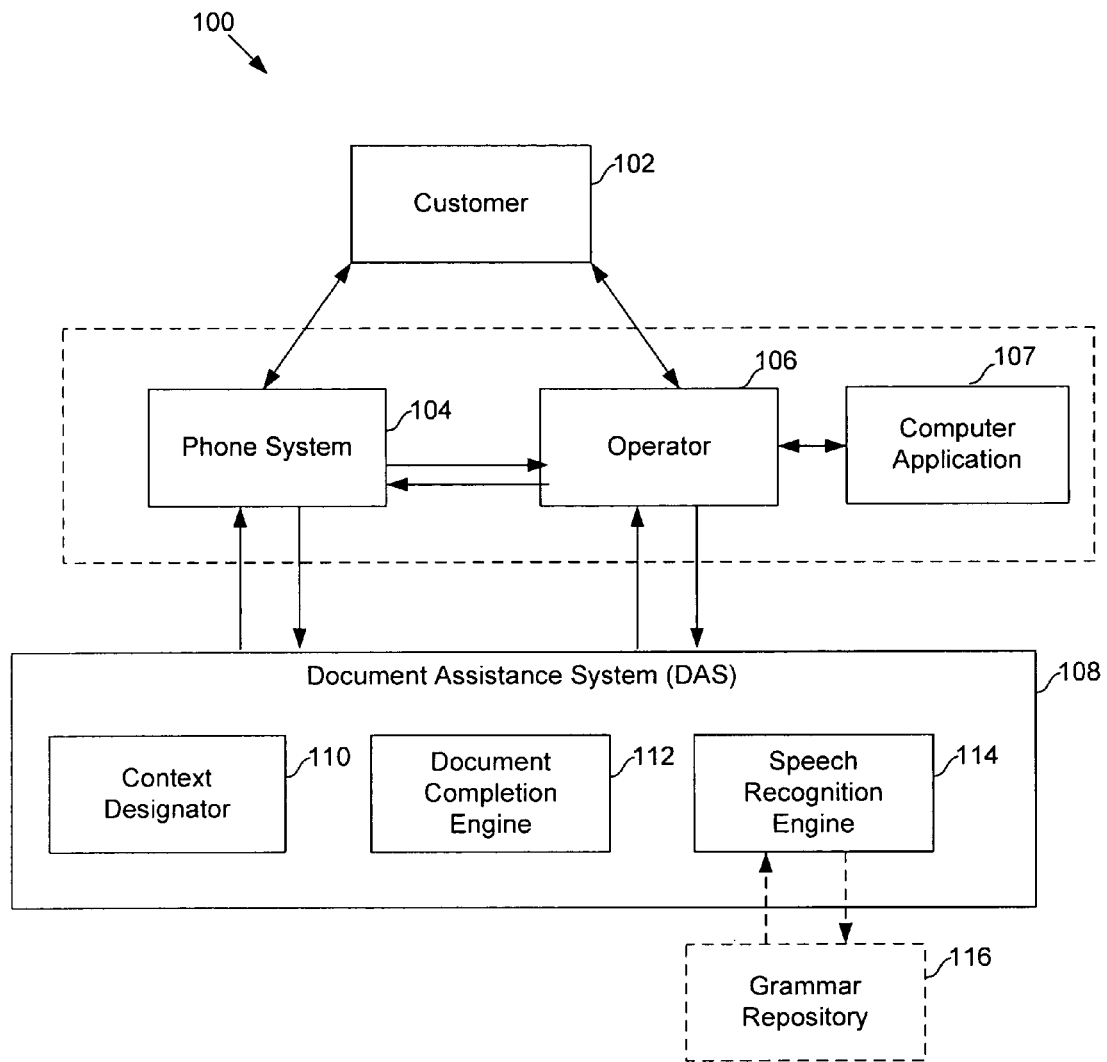
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention.

However, it will be apparent to one of ordinary skill in the art that the invention may be practiced without these specific details. In other instances, well-known features have not been described in detail to avoid obscuring the invention.

In general, embodiments of the invention relate to providing a method and a system for collecting information. More specifically, embodiments of the invention relate using speech recognition technology to capture information electronically. Further, embodiments of the invention provide a method and a system to recognize a live conversation between two individuals as speech, and use cues to interpret and extract information from one or more portions of the live conversation.

FIG. 1 shows a system for assisted form completion in accordance with one or more embodiments of the invention. The system architecture includes a customer (102) interacting with an operator (106) via a phone system (104). In one embodiment of the invention, the operator (106) and the phone system (104) are communicating with the Document Assistance System (DAS) (108). The DAS (108) further includes a Context Designator (110), a Document Completion Engine (112), and a Speech Recognition Engine (114). Optionally, the Speech Recognition Engine (114) may interact with a grammar repository (116). Each of the aforementioned components of FIG. 1 is described below.

In one or more embodiments of the invention, the customer (102) may be any individual that is capable of participating in a live conversation. For example, the customer (102) may be an individual representing a household or a family, an individual associated with a corporation or company, etc. In one or more embodiments of the invention, the customer may be a vendor, a banker, a business partner, or any other individual that receives or provides goods/services to/from the operator (106) or the organization represented by the operator (106).

Further, the operator (106) may be an individual working for a variety of organizations including: a small business, a large corporation, a service center, etc. In one or more embodiment of the invention, the phone system (104) may be any system incorporating at least one phone and a computer system, such as, a single business phone, a switchboard that operates several phones and phone lines at a time, etc. In one or more embodiments of the invention, the customer (102) and the operator (106) conduct a live, real-time conversation, which is channeled through the phone system (104). Specifically, the customer (102) may place a phone call to the operator or the operator's place of employment for some type of customer support. For example, the customer (102) may provide/request particular information, schedule an appointment to receive services provided by the operator or the operator's (106) employer, make a purchase/sell a produce over the telephone, request for a modification to be made to particular information associated with the customer or the customer's organization, etc. In one or more embodiments of the invention, the phone system (104) may be used for any phone interaction that is part of a computer workflow (e.g., vendor, supplier, banker, etc.).

Further, the live conversation described above may occur over a variety of communication devices. For example, the conversation could occur between two standard phones over a standard phone line, between a digital phone and a standard phone over a hybrid connection, between two digital phones over a digital connection, between two computer applications with voice chat capabilities, etc.

In one or more embodiments of the invention, the phone system (104) is configured to forward the live conversation between the customer (102) and the operator (106) to the Document Assistance System (DAS) (108). As shown in FIG. 1, the DAS (108) includes a Context Designator (110), a Document Completion Engine (112), and a Speech Recognition Engine (114). In one or more embodiments of the invention, the DAS (108) is responsible for processing the live conversation and capturing information from the live conversation. In one embodiment of the invention, the DAS (108) uses speech recognition technology to process and capture information from the live conversation. More specifically, the DAS (108) uses the Speech Recognition Engine (114) to recognize the live conversation as text. Further, the DAS (108) is also configured to place the information captured from the live conversation into a particular context associated with a form or document actively in use by the operator.

The Speech Recognition Engine (114) may use a variety of well-known speech recognition technologies to recognize the live conversation between the customer (102) and the operator (106) as text. For example, in one embodiment of the invention, the Speech Recognition Engine (114) may use a restricted grammar to increase accuracy and efficiency. The restricted grammar may be stored in a grammar repository (116) operatively connected to the Speech Recognition Engine (114). Restricted grammar provides the Speech Recognition Engine (114) with a limited vocabulary that the Speech Recognition Engine (114) can identify from a live conversation. Further, the grammar may be related to a context or an attribute. For example, suppose an operator is processing customer calls at a plumber's office. In this case, the context could be a form for documenting plumbing problems, and a restricted grammar that is configured to expect certain plumbing terms such as "pipes", "toilet", or "leak" may be used by the Speech Recognition Engine (114). Alternatively, in one embodiment of the invention, the restricted grammar may be a database of "likely vocabulary" which will weight the probabilities of certain words and phrases as higher than other words and phrases.

Alternatively, in one embodiment of the invention, a restricted grammar for recognizing speech associated with common information fields may be used. For example, common fields of information may include a customer name, an address, an occupation, a phone number, etc. In this case, the restricted grammar may expect words or phrases associated with such fields of customer information. In one embodiment of the invention, the Speech Recognition Engine (114) is a learning engine that improves accuracy and performance using corrections made by the operator (106) such that the Speech Recognition Engine (114) may be better able to recognize types of customer information in the future.

Continuing with FIG. 1, the DAS (108) includes functionality to process the speech recognized by the Speech Recognition Engine (114) by designating a context for the conversation through the Context Designator (110). Further, the Context Designator (110) is responsible for recognizing cues and relating text from the live conversation with fields in the document/form based on the cues. In one embodiment of the invention, the Context Designator (110) may be operatively connected to a repository (not shown) configured to store documents/forms that are retrieved to record information from the live conversation. Further, in one or more embodiments of the invention, the system of FIG. 1 may include a computer application (107) running on a computer system (not shown) configured to present one or more forms to the operator. Thus, the form/document retrieved and automatically completed using the DAS (108) is presented on-screen to the operator by the computer application (107).

In one embodiment of the invention, the Context Designator (110) is aware of the current form/document presented by the computer application (107). In one embodiment of the invention, the developer of the computer application (107) has embedded code in the computer application (107) to activate the Context Designator (110) for that particular form/document. Further, the Context Designator (110) is provided with all the "metadata" associated with the current form presented by the computer application (107). The metadata may be in the form of a list of possible cues, an identification (ID) for a data field within the form, and/or the type of data field. Given this information, the Context Designator (110) includes functionality to "listen for" cues as it obtains a stream of text from the Speech Recognition Engine (114). Upon "hearing" a cue, the Context Designator (110) knows the associated data field ID and type. Thus, the Context Designator (110) is able to inform the Speech Recognition Engine (114) to look for address data, a phone number, a name, etc. Said another way, in one embodiment of the invention, the Context Designator (110) provides cues to the speech recognition engine about the type of information to expect. In this manner, the Context Designator creates a "context" for the Speech Recognition Engine (114).

Those skilled in the art will appreciate that the context designated by the Context Designator (110) may be any number of methods for storing information (e.g., a computer application that interfaces with a repository designed to store customer information, a spreadsheet, etc.).

In one embodiment of the invention, a cue is a particular word or phrase that triggers the recording of information from the live conversation. That is, a cue indicates to the DAS (108) that a portion of the live conversation following the cue needs to be recorded in a form or document. More specifically, in one or more embodiments of the invention, a cue is a word or phrase that indicates that the customer portion of the live conversation following the cue needs to be recorded to complete one or more information fields in a document. For example, a cue may be the word "name," the phrase "mailing address," the phrase "For what type of service are you calling today?," etc. In one or more embodiments of the invention, the cue may be a pre-defined verbal cue (such as the aforementioned words and/or phrases) or visual. A visual cue may include the operator physically moving a cursor to a particular information field, thereby triggering the recording of information into that particular information field.

In one embodiment of the invention, the DAS (108) may process the live conversation using the Document Completion Engine (112) and the Speech Recognition Engine (114). Specifically, the Document Completion Engine (112) stores information into the context designated by the Context Designator (110). Said another way, the Document Completion Engine (112) is responsible for actually filling out the document/form presented by the computer application (107). The Document Completion Engine (112) uses information from the Context Designator (110) (e.g., data field IDs) and the Speech Recognition Engine (114) (i.e., recognized text) to actually populate the document/form in the computer application (107). In one or more embodiments of the invention, the operator (106) may proof and correct information filled out by the Document Completion Engine (112) or enter certain portions of data directly, without having the Document completion Engine (112) complete those certain portions.

In one embodiment of the invention, the speech recognition engine converts the entire live conversation to text, while the document completion engine records only the relevant customer information into a context (i.e., a document or a form used to store customer information). Those skilled in the art will appreciate that the document completion engine may distinguish between the customer and the operator because the Speech Recognition Engine may recognize the difference between the operator's voice and the customer's voice. In this manner, the document completion engine may know when the customer is speaking and when the operator is speaking so that information spoken by the operator is not recorded into the form presented by the computer application (107).

In one embodiment of the invention, a library may exist which can be embedded in an existing or new computer application (107) described above, and the existing/new application "adds" the automatic speech recognition filling of forms to its own functionality by providing information to the library and invoking the library at the appropriate places in the application workflow. In one embodiment of the invention, the DAS (108) may be such a library, where the DAS (108) is configured to provide such a utility to an application, and the application is in control of when and how to invoke the automatic speech recognition functionality to complete one or more forms during a live conversation.

Figure 2:
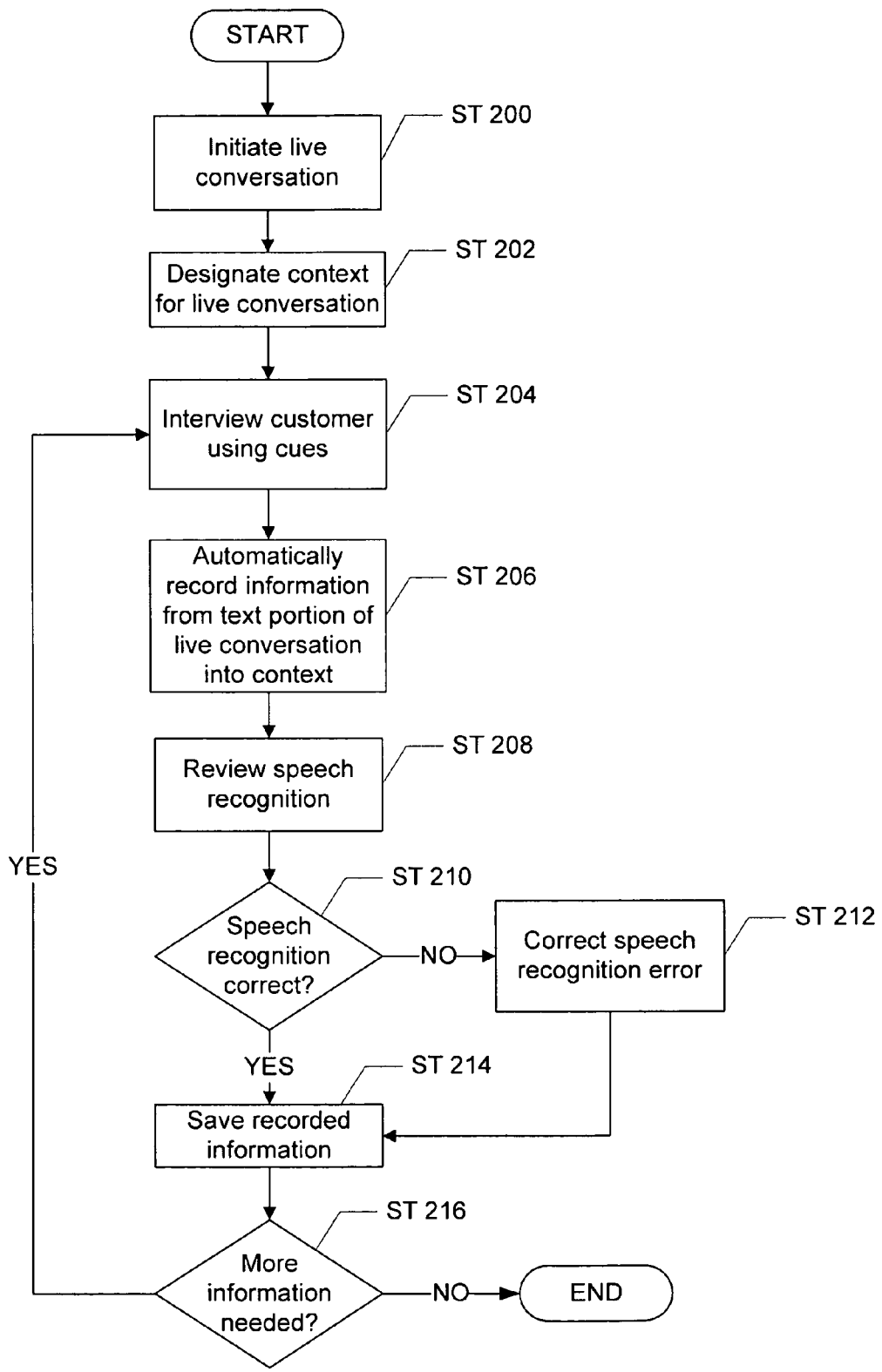
FIGS. 2-3 show flow charts for converting a live conversation to text for assisted form filling in accordance with one or more embodiments of the invention.

FIG. 2 shows a flow chart for assisted form completion in accordance with one or more embodiments of the invention. Initially, a customer initiates a live conversation with an operator (Step 200). The customer may then make subsequent selections associated with a service or purchase by speaking with the operator. Either verbal clues or operator actions establish a context for the live conversation (Step 202). In one embodiment of the invention, the context is designated by converting the live conversation to text, recognizing portions of the live conversation between the customer and the operator as a text portion and using the textual information to determine what type of context is required for that particular live conversation. In one embodiment of the invention, the designated context may be information about the form (metadata) that can help in recognition of information fields in which to store customer information. Those skilled in the art will appreciate that the entire conversation may be converted to text and either portions of the live conversation may be recognized as text portions or the entire converted live conversation may be recognized as a text portion. Alternatively, only portions of the live conversation may be converted to text.

Those skilled in the art will appreciate that in one or more embodiments of the invention, initial portions of the customer's conversation may take place with an automated phone system (i.e., a machine that walks the customer through certain steps in the process of collecting customer information or identifying the customer's need until an operator takes over). In this case, portions of the context designation and/or speech recognition may occur while the customer is interfacing with the automated phone system, before the live conversation with an operator begins.

Continuing with FIG. 2, upon designation of the context, the operator may begin interviewing the customer using cues associated with speech recognition and document completion (Step 204). That is, at relevant portions of the live conversation, the operator may recite cues signaling that document completion for purposes of recording information into a particular information field should begin. For example, in one embodiment of the invention, the cues may be particular words within verbal phrases such as "Could you please give me your full name?" or "What is your home address?" where the cue is the word "name" and "address." Alternatively, in one or more embodiments of the invention, cues may be more elaborate by including entire phrases. In one embodiment of the invention, the cues recited by the operator may correspond to information that is included in the context that includes the information field to be completed with customer information. For example, if the information field on a document or form that is used to record customer information is preceded by the phrase "home address," then that phrase may constitute the cue used by the operator and recognized by the DAS.

Further, in one embodiment of the invention, cues may be associated with voice tone or pitch, where the operator is aware that particular words or phrases are spoken in a particular tone, which initiates the speech recognition process. Those skilled in the art will appreciate that the operator could also cue provides visual cues using an input/output interface device such as a mouse or a keyboard. For example, the operator may use the mouse and/or keyboard to place a cursor in a particular field in a document/form. Placing the cursor in a particular place on the document/form may trigger the speech recognition process so that the portion of the live conversation after movement of the cursor into a particular location is recorded into the document/form. Subsequently, upon using cues to signal which information field is active, the document/form is automatically filled in with information obtained from a portion of the live conversation recognized as text (Step 206).

Those skilled in the art will appreciate that the portion of the live conversation that is used to record information in to a particular context may be a customer portion of the live conversation or an operator portion of the live conversation. For example, in one embodiment of the invention, after the cue is invoked to trigger the speech recognition process, the customer's works/phrases may be unclear, in which the operator may clarify the portion of the live conversation after the cue, and the operator's words/phrases may be recorded into a particular context.

Simultaneously or subsequent to the completion of the recording of information into the document/form, the document/form may be reviewed to check whether the speech recognition was performed accurately and to confirm the validity of the information (Step 208). If the information recorded from the live conversation is correct, the recorded information is saved (Step 214). However, if a recording error is found, the error may be corrected manually before saving the information (Step 212).

Those skilled in the art will appreciate that corrections of errors in recorded information may occur while the live conversation continues and while other information is being recorded into other portions of the document/form. At this stage, a determination is made as to whether all necessary information (e.g., customer information) has been obtained and recorded (Step 216). If more information is necessary, the live conversation continues as described above, and Steps 204-216 are repeated. If all necessary customer information has been recorded, then the process ends.

Figure 3:
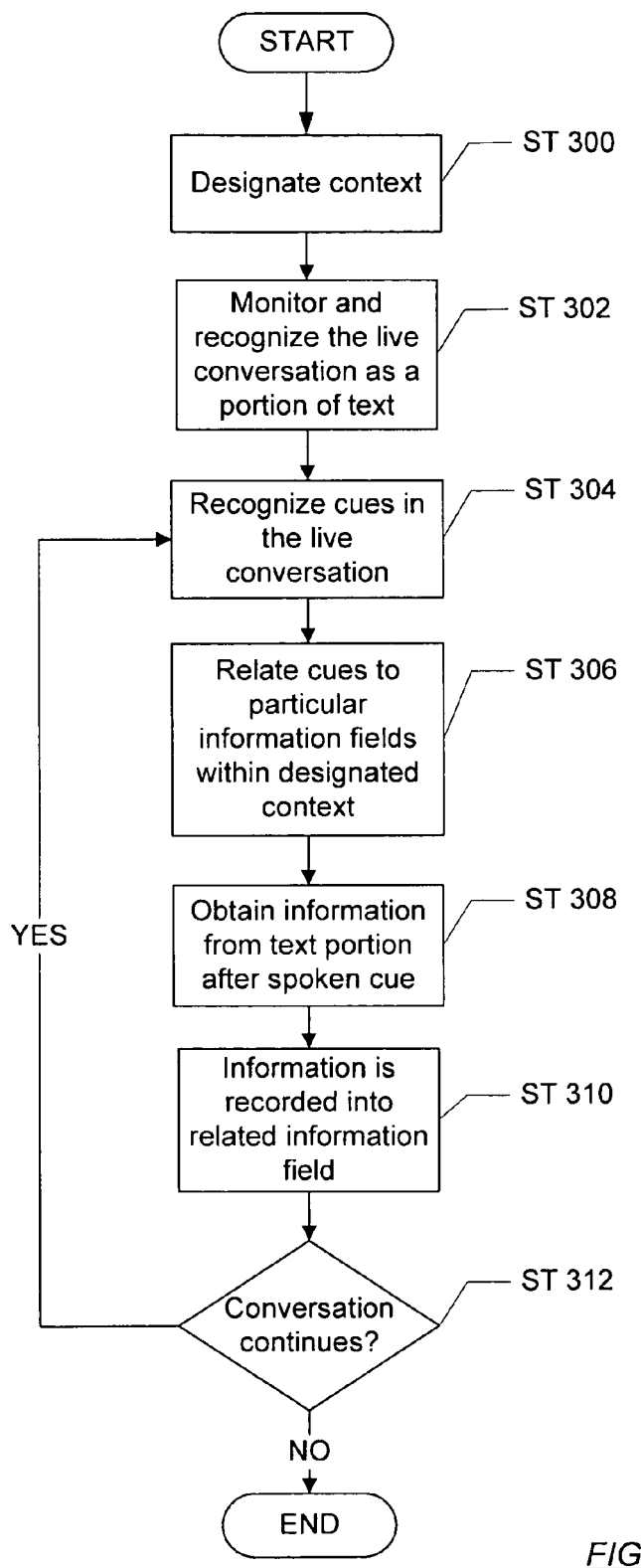

FIG. 3 shows a flow chart for assisted form completion in accordance with one or more embodiments of the invention. Particularly, FIG. 3 shows a flow chart for the process of assisted form completion from the perspective of the DAS. Initially, a context associated with the live conversation is designated (Step 300). In one embodiment of the invention, the context may be designated by an application running on a computer system. Subsequently, the live conversation between the operator and the customer is processed by monitoring the live conversation and recognizing the speech as a portion of text (Step 302). That is, the live conversation is converted to text, after which portions of the live conversation are recognized as text portions.

At this stage, the live conversation recognized as a portion of text may be processed to identify any cues in the live conversation (Step 304). Next, each recognized cue is related to an information field in the context (i.e., the form or document used to record customer information) (Step 306). That is, for example, the cue "name" would be related to the name field within the context. Next, information from the text portion spoken after the recognized cue is obtained (Step 308). More specifically, in one or more embodiments of the invention, the information from the portion of text following each recognized cue may be recorded as information relating to the information field (Step 310). That is, the information recorded into an information field may be obtained from the recognized portion of text after identifying cues after which relevant information to be recorded in one or more information fields is likely to be spoken. Those skilled the art will appreciate that if the live conversation continues, then Steps 304-312 are repeated until all relevant customer information is obtained and recorded into the document/form or other context being used to capture customer information electronically.

In one embodiment of the invention, the end of the live conversation may be recognized using a cue, so that the live conversation can stop being converted to text. For example, the end of the live conversation (or at least the end of the portion of the live conversation from which customer information is extracted) may be recognized when the operator resumes speaking or when the operator says "Thank you" or other cue phrases.

Upon recording relevant information, additional processing on the information may be performed to remove any surplus information. In one embodiment of the invention, the Document Completion Engine may have access to a list of common phrases that should be removed before completing (i.e., filling in) the information field. For example, when interpreting customer information associated with a name field, the Document Completion Engine may remove the phrase "my name is" before entering the customer information into the name field.

The following is an example of the process described in FIGS. 2 and 3 above. Consider the scenario in which a customer calls a plumber's office to make an appointment for plumbing work that needs to be performed on the customer's home. When the customer calls the plumber's office, an operator answers the phone and initiates a live, real-time conversation with the customer. As soon as the operator learns the nature of the customer's call, the operator can designate a context for the conversation, in this case the context being a work request form. The DAS can then display a work request form and begin monitoring (i.e., listening to) the live conversation between the customer and the operator. The operator may then ask the customer "What is your full name?" where the phrase "full name" is a designated cue for completion of the name field in the work request form. The customer may then reply, "My name is Jon Smith," which would be recognized as text and sent to the Document Completion Engine as relating to the name field.

In this case, the text "My name is Jon Smith" may be processed by first consulting a repository for surplus phrases and then removing the phrase "My name is" from the text. The name field may subsequently be completed with the remaining text "Jon Smith." Alternatively, the operator may remove surplus portions of recorded text upon reviewing the work request form. In one embodiment of the invention, the operator may review the information in the name field and ask the customer how he spells his first name. Notice that this part of the conversation did not have a cue from the operator and is not processed by the DAS. Learning that the customer's first name has been misspelled and should be "John," the operator may correct the information in the name field while simultaneously continuing the interview to ask for the customer's home address. The DAS recognizes the cue "address" and begins monitoring the live conversation for information related to the home address field. This information is processed in a similar manner as described above with respect to the customer's name. For the address information, a restricted grammar specialized for addresses is used to recognize the customer's answer with greater accuracy and efficiency. The operator can continue to interview the customer in a similar fashion as described above until all the information fields of the document have been completed and all relevant customer information has been recorded to satisfy the purpose of the customer's call.

Figure 4:
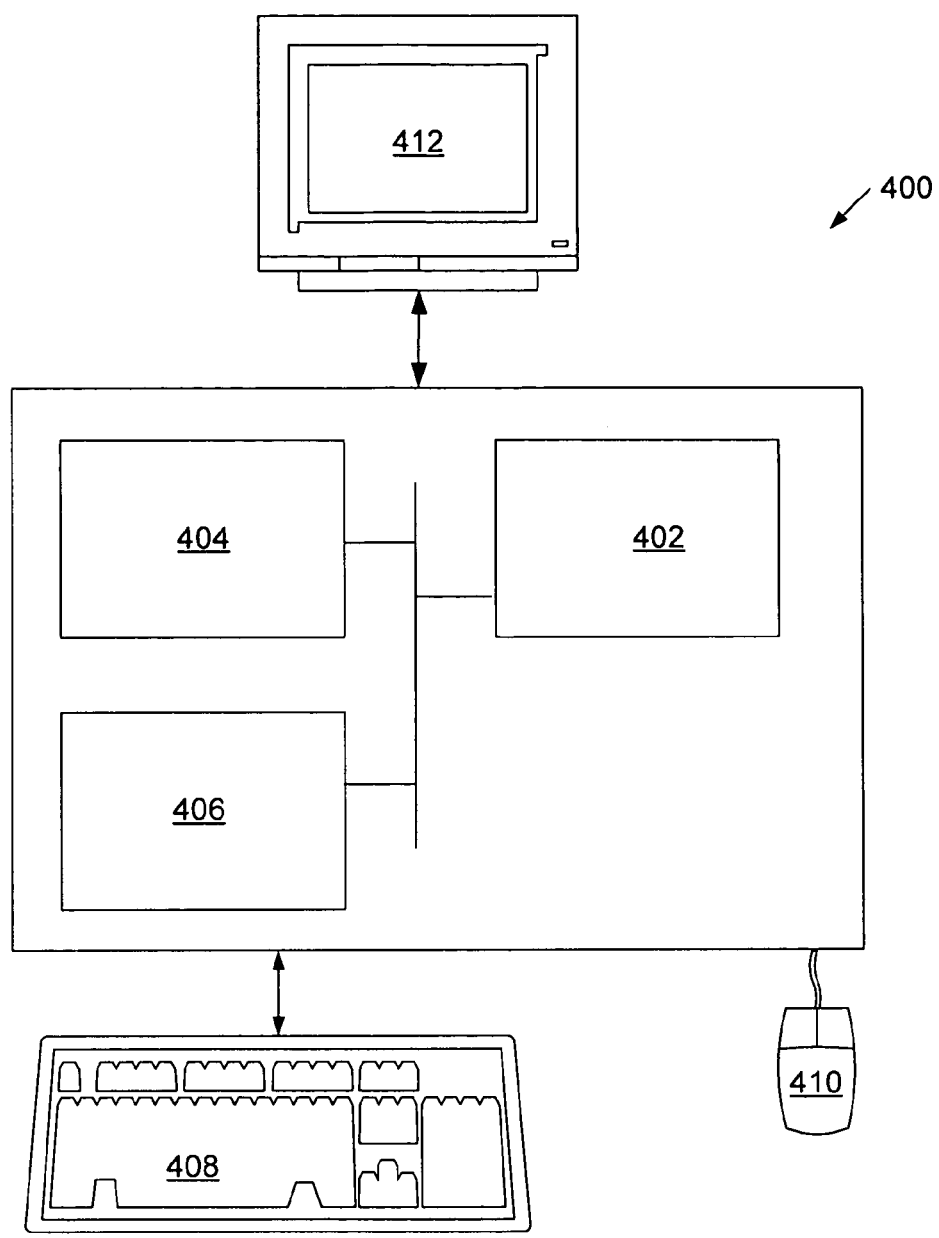
FIG. 4 shows a computer system in accordance with on or more embodiments of the invention.

The invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network. (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (400) may be located at a remote location and connected to the other elements over a network.

Further, the invention may be implemented on a distributed system having a plurality of nodes, where each portion of the invention (e.g., Speech Recognition Engine, Document Completion Engine, Context Designator, etc.) may be located on a different node within the distributed system. In one embodiment of the invention, the node corresponds to a computer system. Alternatively, the node may correspond to a processor with associated physical memory.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for capturing information from a live conversation between an operator and a customer, comprising:
   designating a context for the live conversation between the operator and the customer wherein the context is a form viewed on a computer screen and actively in use by the operator;
   setting, by the operator during the live conversation, a visual cue by physically moving a cursor to an information field in the form;
   monitoring the live conversation in response to setting the visual cue, wherein the visual cue triggers the conversion of the live conversation to text;
   recognizing at least one portion of the live conversation as a text portion after converting the live conversation to text;
   interpreting one or more cues in the live conversation, wherein the one or more cues comprises at least the visual cue;
   relating the one or more cues to the information field associated with the context for the live conversation; and
   storing information obtained from the text portion of the live conversation into the information field, wherein the information obtained from the text portion comprises at least one word spoken after the one or more cues.

2. The method of claim 1, wherein the at least one word spoken after the visual cue is spoken by the customer.

3. The method of claim 1, wherein the operator and the customer are individuals.

4. The method of claim 1, wherein at least one of the one or more cues is a pre-defined verbal cue spoken by the operator.

5. The method of claim 4, wherein at least one of the one or more cues is designated by a phrase preceding the information field in the context.

6. The method of claim 1, wherein the operator confirms an accuracy of the information stored before the context is saved.

7. The method of claim 6, wherein the operator corrects errors in the stored information while continuing the live conversation.

8. The method of claim 1, wherein the information field is designated as a particular type of information, and wherein the particular type of information is at least one selected from a group consisting of a number, a date, a phrase, a formatted number, and a formatted phrase.

9. The method of claim 1, wherein the live conversation occurs using at least one selected from a group consisting of an analog phone, a digital phone, and a computer.

10. A system for capturing information from a live conversation between an operator and a customer, comprising:
    a context designator executing on a processor and configured to:
       designate a context for the live conversation between the operator and the customer wherein the context is a form viewed on a computer screen and actively in use by the operator;
       obtain a visual cue setting from the operator during the live conversation, wherein the operator sets the visual cue by physically moving a cursor to an information field in the form;
       monitor the live conversation in response to setting the visual cue, wherein the visual cue triggers the conversion of the live conversation to text;
    a speech recognition engine executing on the processor and configured to recognize the live conversation as a text portion after converting the live conversation to text; and
    a document completion engine executing on the processor and configured to:
       interpret one or more cues in the live conversation, wherein the one or more cues comprises at least the visual cue;
       relate the one or more cues to the information field associated with the context for the live conversation; and
       store information obtained from the text portion into the information field within the context, wherein the information obtained from the text portion comprises at least one word spoken after the one or more cues.

11. The system of claim 10, wherein the at least one word spoken after the visual cue is spoken by the customer.

12. The system of claim 10, wherein the speech recognition engine is further configured to improve accuracy of recognizing the live conversation as the text portion based on corrections made by the operator.

13. The system of claim 10, wherein the speech recognition engine recognizes the live conversation as the text portion using a restricted grammar.

14. The system of claim 10, wherein the information field is designated as a particular type of information, and wherein the particular type of information is at least one selected from a group consisting of a number, a date, a phrase, a formatted number, and a formatted phrase.

15. The system of claim 10, wherein the live conversation occurs using at least one selected from a group consisting of an analog phone, a digital phone, and a computer.

16. The system of claim 10, wherein the operator manually corrects errors in the stored information while continuing the live conversation.

17. The system of claim 16, wherein the speech recognition engine learns from the manually corrected errors.

18. The system of claim 10, wherein the one or more cues comprises a pre-defined verbal phrase recognized by the speech recognition engine.

19. A computer readable storage medium comprising instructions embodied thereon to perform a method for capturing information from a live conversation between an operator and a customer, comprising:
- designating a context for the live conversation between the operator and the customer wherein the context is a form viewed on a computer screen and actively in use by the operator;
- setting, by the operator during the live conversation, a visual cue by physically moving a cursor to an information field in the form;
- monitoring the live conversation in response to setting the visual cue, wherein the visual cue triggers the conversion of the live conversation to text;
- recognizing at least one portion of the live conversation as a text portion after converting the live conversation to text;
- interpreting one or more cues in the live conversation, wherein the one or more cues comprises at least the visual cue;
- relating the one or more cues to the information field associated with the context for the live conversation; and
- storing information obtained from the text portion of the live conversation into the information field, wherein the information obtained from the text portion comprises at least one word spoken after the one or more cues.

20. The computer readable storage medium of claim 19, wherein the at least one word spoken after the visual cue is spoken by the customer.

21. The computer readable storage medium of claim 19, wherein the information field is contained within an external computer application.

22. The computer readable storage medium of claim 19, wherein at least one of the one or more cues is a pre-defined verbal cue spoken by the operator.

23. A computer readable storage medium organized in a library comprising instructions embodied thereon to provide a method for capturing information from a live conversation between an operator and a customer, comprising:
- designating a context for the live conversation between the operator and the customer wherein the context is a form viewed on a computer screen and actively in use by the operator;
- setting, by the operator during the live conversation, a visual cue by physically moving a cursor to an information field in the form;
- monitoring the live conversation in response to setting the visual cue, wherein the visual cue triggers the conversion of the live conversation to text;
- recognizing at least one portion of the live conversation as a text portion after converting the live conversation to text;
- interpreting one or more cues in the live conversation, wherein the one or more cues comprises at least the visual cue;
- relating the one or more cues to the information field associated with the context for the live conversation; and
- storing information obtained from the text portion of the live conversation into the information field, wherein the information obtained from the text portion comprises at least one word spoken after the one or more cues.

24. The computer readable storage medium of claim 23, wherein the library is used to write a separate computer application for capturing customer information.

25. A computer system for capturing information from a live conversation between an operator and a customer, comprising:
- a processor;
- a memory;
- a storage device; and
- software instruction stored in the memory for enabling the computer system under control of the processor to:
  - designate a context for the live conversation between the operator and the customer wherein the context is a form viewed on a computer screen and actively in use by the operator;
  - set, by the operator during the live conversation, a visual cue by physically moving a cursor to an information field in the form;
  - monitor the live conversation in response to setting the visual cue, wherein the visual cue triggers the conversion of the live conversation to text;
  - recognize at least one portion of the live conversation as a text portion after converting the live conversation to text;
  - interpret one or more cues in the live conversation, wherein the one or more cues comprises at least the visual cue;
  - relate the one or more cues to the information field associated with the context for the live conversation; and
  - store information obtained from the text portion of the live conversation into the information field, wherein the information obtained from the text portion comprises at least one word spoken after the one or more cues.

* * * * *